United States Patent
Sohn et al.

(10) Patent No.: US 9,430,082 B2
(45) Date of Patent: Aug. 30, 2016

(54) ELECTRONIC DEVICE FOR EXECUTING DIFFERENT FUNCTIONS BASED ON THE TOUCH PATTERNS USING DIFFERENT PORTIONS OF THE FINGER AND CONTROL METHOD THEREOF

(71) Applicant: LG ELECTRONICS INC., Seoul (KR)

(72) Inventors: Youngho Sohn, Seoul (KR); Hyewon Song, Seoul (KR); Yeongkyu Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 14/152,151

(22) Filed: Jan. 10, 2014

(65) Prior Publication Data

US 2014/0267100 A1   Sep. 18, 2014

(30) Foreign Application Priority Data

Mar. 15, 2013   (KR) .................. 10-2013-0028082

(51) Int. Cl.
*G06F 3/041* (2006.01)

(52) U.S. Cl.
CPC ..... *G06F 3/0416* (2013.01); *G06F 2200/1636* (2013.01)

(58) Field of Classification Search
None
See application file for complete search history.

(56) References Cited

U.S. PATENT DOCUMENTS

| 2006/0071912 A1* | 4/2006 | Hill ...................... G06F 3/0416 345/173 |
| 2007/0079206 A1 | 4/2007 | Arora et al. |
| 2010/0085216 A1 | 4/2010 | Ms |
| 2011/0018825 A1 | 1/2011 | Kondo et al. |
| 2011/0053641 A1 | 3/2011 | Lee et al. |
| 2011/0096036 A1* | 4/2011 | McIntosh ................ G06F 3/043 345/177 |
| 2011/0102350 A1 | 5/2011 | Jung |

(Continued)

FOREIGN PATENT DOCUMENTS

| EP | 1930835 | 6/2008 |
| WO | 2013/136548 | 9/2013 |

OTHER PUBLICATIONS

Heo, et al., "ForceTap: Extending the Input Vocabulary of Mobile Touch Screens by adding Tap Gestures," MobileHCI 2011, Aug. 2011, XP55010529, pp. 113-122.

(Continued)

*Primary Examiner* — Ilana Spar
*Assistant Examiner* — Kirk Hermann
(74) *Attorney, Agent, or Firm* — Lee, Hong, Degerman, Kang & Walmey; Jonathan Kang; Michael Monaco

(57) ABSTRACT

An electronic device and a method of controlling the same, where the electronic device includes a touchscreen, a sensing unit configured to sense a touch pattern applied to the touchscreen, a memory configured to store a function corresponding to the touch pattern, and a controller configured to sense a touch pattern of a touch input through the sensing unit upon reception of the touch input through the touchscreen and to execute a function corresponding to the sensed touch pattern, stored in the memory, wherein the sensing unit recognizes the touch pattern based on vibration generated when the touch input is received through the touchscreen. Accordingly, touch patterns can be discriminated based on portions of a finger, which come into contact with the touchscreen to apply the touch patterns, and different functions respectively corresponding to the touch patterns can be executed.

8 Claims, 21 Drawing Sheets

(56) References Cited

U.S. PATENT DOCUMENTS

2011/0191680 A1* 8/2011 Chae et al. .................. 715/716
2011/0291821 A1* 12/2011 Chung ................ G06F 3/03547
  340/407.2
2013/0057489 A1 3/2013 Morton et al.

OTHER PUBLICATIONS

European Patent Office Application Serial No. 14151837.3, Search Report dated Jul. 2, 2014, 10 pages.

* cited by examiner (a)

(b)

(c)

(a)    (b)

(a)

(b)

(a)

(b)

(c)

(a)

(b)

(c)

ELECTRONIC DEVICE FOR EXECUTING DIFFERENT FUNCTIONS BASED ON THE TOUCH PATTERNS USING DIFFERENT PORTIONS OF THE FINGER AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2013-0028082, filed on Mar. 15, 2013, the contents of which are hereby incorporated by reference herein in their entirety.

BACKGROUND OF THE INVENTION

1. Field of the Invention

The present invention relates to an electronic device and a method of controlling the same, and more particularly, to an electronic device and a method of controlling the same to discriminate touch patterns input using different portions of a finger, which come into contact with a touchscreen, and execute different functions respectively corresponding to the touch patterns.

2. Discussion of the Related Art

As functions of terminals such as personal computers, laptop computers, cellular phones diversify, the terminals become multimedia players having multiple functions for capturing pictures or moving images, playing music, moving image files and games and receiving broadcasting programs.

Terminals can be categorized as mobile terminals and stationary terminals. The mobile terminals can be further comprised of handheld terminals and vehicle mount terminals according to whether users can personally carry the terminals. Conventional terminals including mobile terminals provide an increasing number of complex and various functions.

To support and enhance the increasing number of functions in a terminal, improving a structural part and/or a software part of the terminal would be desirable.

SUMMARY OF THE INVENTION

Accordingly, the present invention is directed to an electronic device and a method of controlling the same to discriminate touch patterns input using different portions of a finger, which come into contact with a touchscreen, and execute different functions respectively corresponding to the touch patterns.

It is to be understood that both the foregoing general description and the following detailed description of the present invention are exemplary and explanatory and are intended to provide further explanation of the invention as claimed.

To accomplish the object of the present invention, an electronic device according to one aspect of the present invention includes a touchscreen, a sensing unit configured to sense a touch pattern applied to the touchscreen, a memory configured to store a function corresponding to the touch pattern, and a controller configured to sense a touch pattern of a touch input through the sensing unit upon reception of the touch input through the touchscreen and to execute a function corresponding to the sensed touch pattern, stored in the memory, wherein the sensing unit recognizes the touch pattern based on vibration generated when the touch input is received through the touchscreen.

The sensing unit may recognize the touch pattern on the basis of at least one of the magnitude and resonant frequency of vibration generated when the touch input is received through the touchscreen, the area and pressure of the touch input.

The sensing unit may include at least one of an acceleration sensor, a gyro sensor and a touch sensor.

The touch pattern may include at least one of a touch pattern input using a fingertip, a touch pattern input using a nail and a touch pattern input using a knuckle of a bent finger.

The function corresponding to the touch pattern may include at least one of a function of executing a predetermined application, a function of displaying a menu window and a function of selecting a menu.

The electronic device may further include a microphone, wherein, when a touch input is received through the touchscreen during operation of the microphone, the controller senses a touch pattern of the touch input through the sensing unit and executes a function corresponding to the sensed touch pattern.

To accomplish the object of the present invention, a method of controlling an electronic device according to another aspect of the present invention includes: receiving a touch input through a touchscreen; sensing a touch pattern of the touch input through a sensing unit; and executing a function corresponding to the sensed touch pattern, wherein the touch pattern is recognized based on vibration generated when the touch input is received through the touchscreen.

The electronic device and method of controlling the same according to the present invention have the following advantages.

According to the present invention, it is possible to discriminate touch patterns input using different portions of a finger, which come into contact with a touchscreen, and execute different functions respectively corresponding to the touch patterns.

Furthermore, a touch pattern can be identified in consideration of a situation in which the touch pattern is received.

In addition, when touch inputs are received during operation of a microphone, the touch patterns can be discriminated identified and predetermined functions corresponding to the touch patterns can be executed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

An electronic device may be described below with reference to the accompanying drawings. In the following description, suffixes "module" and "unit" may be given to components of the electronic device in consideration of only facilitation of description and do not have meanings or functions discriminated from each other.

The electronic device may include a cellular phone, a smart phone, a laptop computer, a digital broadcasting terminal, personal digital assistants (PDA), a portable multimedia player (PMP), a navigation system and/or so on.

Figure 1:
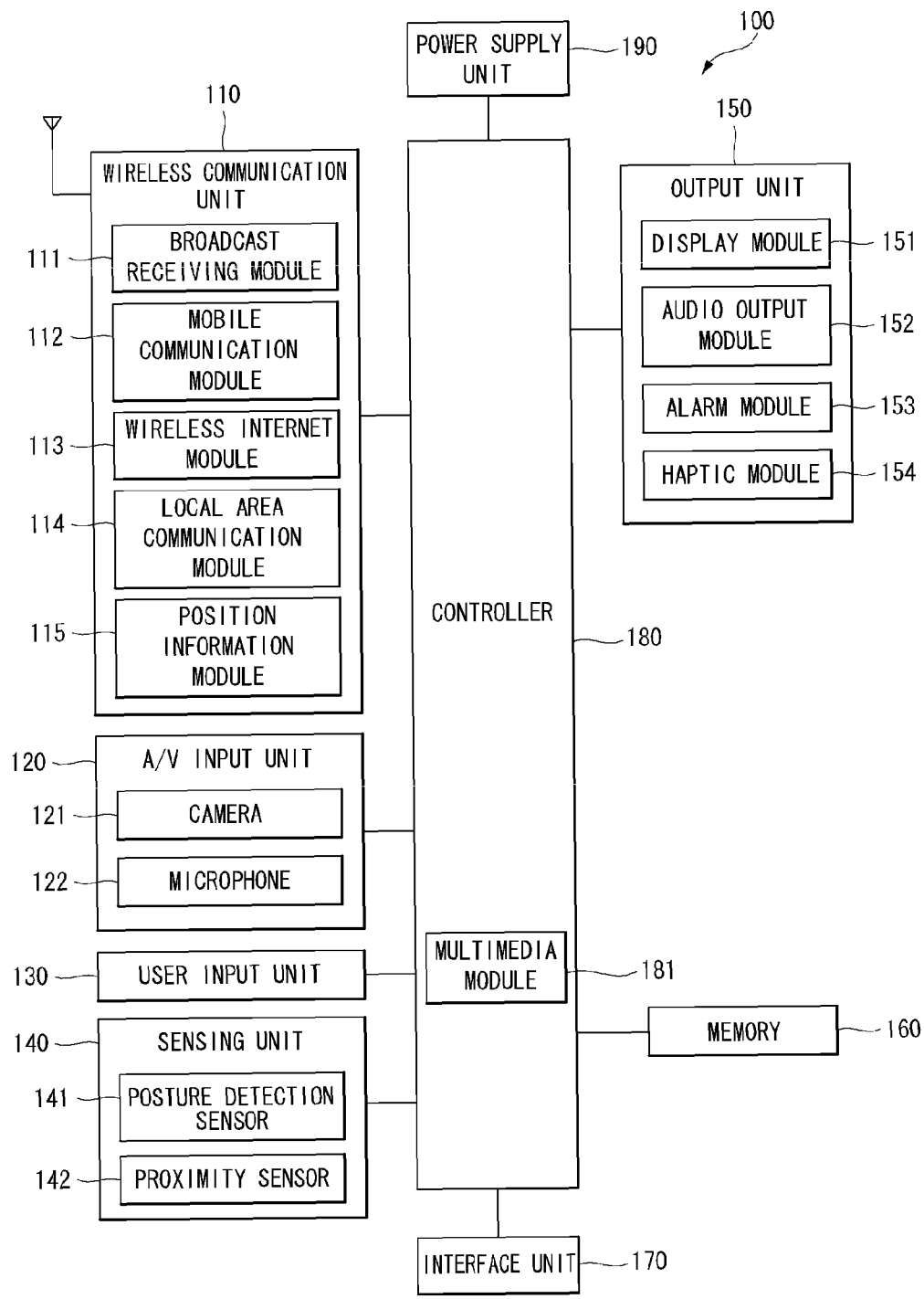
FIG. 1 is a block diagram of a electronic device according to an embodiment.

FIG. 1 is a block diagram of an electronic device according to an embodiment. Other embodiments, configurations and arrangements may also be provided.

As shown, the electronic device 100 may include a wireless communication unit 110 (or radio communication unit), an audio/video (A/V) input unit 120, a user input unit 130, a sensing unit 140, an output unit 150, a memory 160, an interface unit 170, a controller 180, and a power supply 190. The components shown in FIG. 1 may be essential parts and/or a number of components included in the electronic device 100 may vary. Components of the electronic device 100 may now be described.

The wireless communication unit 110 may include at least one module that enables radio communication between the electronic device 100 and a radio communication system or between the electronic device 100 and a network in which the electronic device 100 is located. For example, the wireless communication unit 110 may include a broadcast receiving module 111, a mobile communication module 112, a wireless Internet module 113, a local area communication module 114 (or short range communication module), and a position information module 115 (or local information module).

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (Media-FLO) system, a DVB-H and integrated services digital broadcast-terrestrial (ISDB-T) systems. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the electronic device 100 or may be externally attached to the electronic device 100. Wireless LAN (WLAN or Wi-Fi), wireless broadband (Wibro), world interoperability for microwave access (Wimax), high speed downlink packet access (HSDPA) and so on may be used as a wireless Internet technique.

The local area communication module 114 may correspond to a module for short range communication. Further, Bluetooth®, radio frequency identification (RFID), infrared data association (IrDA), ultra wideband (UWB) and/or Zig-Bee® may be used as a short range communication technique.

The position information module 115 may confirm or obtain a location or a position of the electronic device 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the position information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151, which may be a touchscreen.

The image frames processed by the camera 121 may be stored in the memory 160 or may be transmitted to an external device through the wireless communication unit 110. The electronic device 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the electronic device 100 from a user. The user input unit 130 may include a keypad, a dome switch, a touch pad (constant voltage/capacitance), a jog wheel, a jog switch and/or so on.

The sensing unit 140 may sense a current state of the electronic device 100, such as an open/close state of the electronic device 100, a position of the electronic device 100, whether a user touches the electronic device 100, a direction of the electronic device 100, and acceleration/deceleration of the electronic device 100, and the sensing unit 140 may generate a sensing signal for controlling operation of the electronic device 100. For example, in an example of a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a posture detection sensor 141 and a proximity sensor 142. The sensing unit 140 may sense a motion of the electronic device 100 or a posture associated with the electronic device 100.

The output unit 150 may generate visual, auditory and/or tactile output, and the output unit 150 may include the display module 151, an audio output module 152, an alarm module 153 and a haptic module 154. The display module 151 may display information processed by the electronic device 100. The display module 151 may display a user interface (UI) and/or a graphic user interface (GUI) related to a telephone call when the electronic device 100 is in the call mode. The display module 151 may also display a captured and/or received image, a UI or a GUI when the electronic device 100 is in the video telephony mode or the photographing mode.

The display module 151 may include at least one of a liquid crystal display, a thin film transistor liquid crystal display, an organic light-emitting diode display, a flexible display and/or a three-dimensional display. The display module 151 may be of a transparent type or a light transmissive type. That is, the display module 151 may include a transparent display.

The transparent display may be a transparent liquid crystal display. A rear structure of the display module 151 may also be of a light transmissive type. Accordingly, a user may see an object located behind the body (of the electronic device 100) through the transparent area of the body of the electronic device 100 that is occupied by the display module 151.

The electronic device 100 may also include at least two display modules 151. For example, the electronic device 100 may include a plurality of display modules 151 that are arranged on a single face at a predetermined distance or integrated displays. The plurality of display modules 151 may also be arranged on different sides.

When the display module 151 and a sensor sensing touch (hereafter referred to as a touch sensor) form a layered structure that is referred to as a touchscreen, the display module 151 may be used as an input device in addition to an output device. The touch sensor may be in the form of a touch film, a touch sheet, and/or a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 142 (of the sensing unit 140) may be located in an internal region of the electronic device 100, surrounded by the touchscreen, and/or near the touchscreen.

The proximity sensor 142 may sense an object approaching a predetermined sensing face or an object located near the proximity sensor 142 using an electromagnetic force or infrared rays without having mechanical contact. The proximity sensor 142 may have a lifetime longer than a contact sensor and may thus have a wide application in the electronic device 100.

The proximity sensor 142 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touchscreen may be constructed such that proximity of a pointer is detected through a variation in an electric field according to the proximity of the pointer. The touchscreen (touch sensor) may be classified as a proximity sensor 142.

For ease of explanation, an action of the pointer approaching the touchscreen without actually touching the touchscreen may be referred to as a proximity touch and an action of bringing the pointer into contact with the touchscreen may be referred to as a contact touch. The proximity touch point of the pointer on the touchscreen may correspond to a point of the touchscreen at which the pointer is perpendicular to the touchscreen.

The proximity sensor 142 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the electronic device 100. The audio output module 152 may include a receiver, a speaker, a buzzer, and/or the like. The audio output module 152 may output sounds through an earphone jack. The user may hear the sounds by connecting an earphone to the earphone jack.

The alarm module 153 may output a signal for indicating generation of an event of the electronic device 100. For example, an alarm may be generated when receiving a call signal, receiving a message, inputting a key signal, and/or inputting a touch. The alarm module 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The electronic device 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touchscreen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The electronic device 100 may also operate in relation to a web storage that performs a storing function of the memory 160 on the Internet.

The interface unit 170 may serve as a path to external devices connected to the electronic device 100. The interface unit 170 may receive data from the external devices or power and transmit the data or power to internal components of the electronic device 100 or transmit data of the electronic device 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the electronic device 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the electronic device 100 through a port of the interface unit 170.

The interface unit 170 may also be a path through which power from an external cradle is provided to the electronic device 100 when the electronic device 100 is connected to the external cradle or a path through which various command signals input by the user through the cradle are transmitted to the electronic device 100. The various command signals or power input from the cradle may be used as signals for confirming whether the electronic device 100 is correctly set in the cradle.

The controller 180 may control overall operations of the electronic device 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touchscreen as characters or images. The power supply 190 may receive external power and internal power and provide power required for operations of the components of the electronic device 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2A:
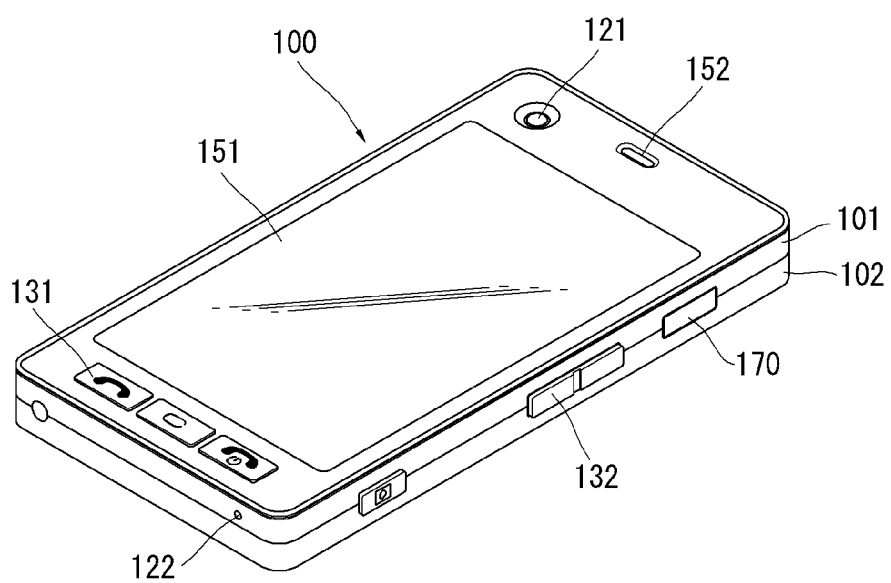
FIG. 2A is a front perspective view of the electronic device according to an embodiment.

FIG. 2A is a front perspective view of an electronic device (or a handheld terminal) according to an embodiment.

The electronic device 100 may be a bar type terminal body. However, embodiments are not limited to a bar type terminal and may be applied to terminals of various types including slide type, folder type, swing type and/or swivel type terminals having at least two bodies that are relatively movably combined.

The terminal body may include a case (a casing, a housing, a cover, etc.) that forms an exterior of the electronic device 100. In this embodiment, the case may be divided into a front case 101 and a rear case 102. Various electronic components may be arranged in the space formed between the front case 101 and the rear case 102. At least one middle case may be additionally provided between the front case 101 and the rear case 102.

The cases may be formed of plastics through injection molding or made of a metal material such as stainless steel (STS) or titanium (Ti).

The display module 151, the audio output unit 152, the camera 121, the user input unit 130/131 and 132, the microphone 122 and the interface unit 170 may be arranged (or provided) in the terminal body, and more specifically may be arranged (or provided) in the front case 101.

The display module 151 may occupy most of the main face of the front case 101. The audio output unit 152 and the camera 121 may be arranged in a region in proximity to one of both ends of the display module 151 and the user input unit 131, and the microphone 122 may be located in a region in proximity to another end of the display module 151. The user input unit 132 and the interface unit 170 may be arranged (or provided) on sides of the front case 101 and the rear case 102.

The user input unit 130 may receive commands for controlling operation of the electronic device 100, and may include a plurality of operating units 131 and 132. The operating units 131 and 132 may be referred to as manipulating portions and may employ any tactile manner in which a user operates the operating units 131 and 132 while having tactile feeling.

The first and second operating units 131 and 132 may receive various inputs. For example, the first operating unit 131 may receive commands such as start, end and scroll and the second operating unit 132 may receive commands such as control of a volume of sound output from the audio output unit 152 or conversion of the display module 151 to a touch recognition mode.

Figure 2B:
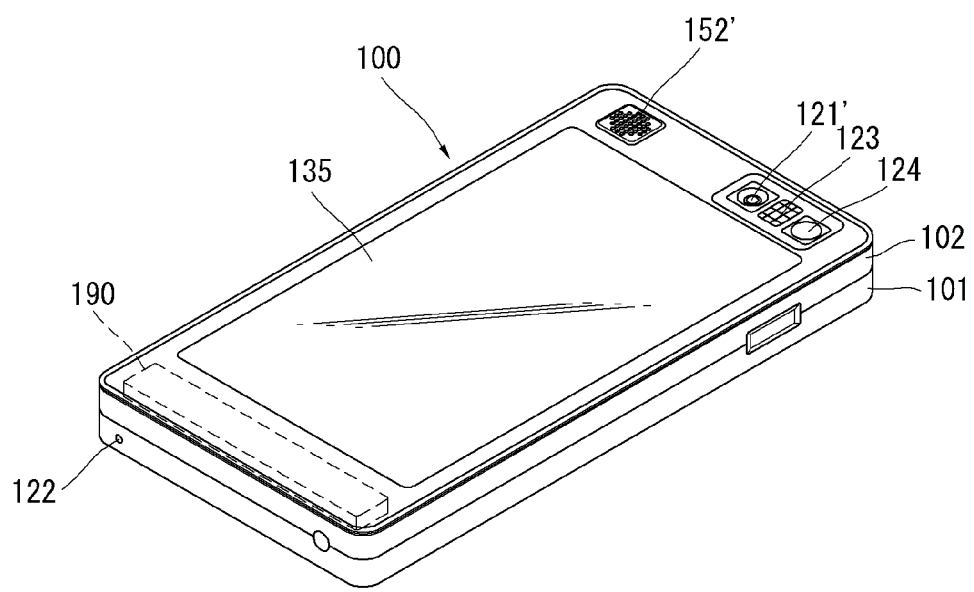
FIG. 2B is a rear perspective view of the electronic device according to an embodiment.

FIG. 2B is a rear perspective view of the electronic device (shown in FIG. 2A) according to an embodiment.

Referring to FIG. 2A, a camera 121' may be additionally attached to the rear side of the terminal body (i.e., the rear case 102). The camera 121' may have a photographing direction opposite to that of the camera 121 (shown in FIG. 2A) and may have pixels different from those of the camera 121 (shown in FIG. 2A).

For example, it may be desirable that the camera 121 has low pixels such that the camera 121 may capture an image of a face of a user and transmit the image to a receiving part in case of video telephony while the camera 121' has high pixels because the camera 121' captures an image of a general object and does not immediately transmit the image in many cases. The cameras 121 and 121' may be attached (or provided) to the terminal body such that the cameras 121 and 121' may rotate or pop-up.

A flash bulb 123 and a mirror 124 may be additionally provided in proximity to the camera 121'. The flash bulb 123 may light an object when the camera 121' takes a picture of the object. The mirror 124 may be used for the user to look at his/her face in the mirror when the user wants to self-photograph himself/herself using the camera 121'.

An audio output unit 152' may be additionally provided on the rear side of the terminal body. The audio output unit 152' may achieve a stereo function with the audio output unit 152 (shown in FIG. 2A) and may be used for a speaker phone mode when the terminal is used for a telephone call.

A broadcasting signal receiving antenna may be additionally attached (or provided) to the side of the terminal body in addition to an antenna for telephone calls. The antenna constructing a part of the broadcast receiving module 111 (shown in FIG. 1) may be set in the terminal body such that the antenna may be pulled out of the terminal body.

The power supply 190 for providing power to the electronic device 100 may be set in the terminal body. The power supply 190 may be included in the terminal body or may be detachably attached to the terminal body.

A touch pad 135 for sensing touch may be attached to the rear case 102. The touch pad 135 may be of a light transmission type, such as the display module 151. In this example, if the display module 151 outputs visual information through both sides thereof, the visual information may be recognized (or determined) by the touch pad 135. The information output through both sides of the display module 151 may be controlled by the touch pad 135. Otherwise, a display may be additionally attached (or provided) to the touch pad 135 such that a touchscreen may be arranged (or provided) even in the rear case 102.

The touch pad 135 may operate in connection with the display module 151 of the front case 101. The touch pad 135 may be located in parallel with the display module 151 behind the display module 151. The touch panel 135 may be identical to or smaller than the display module 151 in size.

Figure 2C:
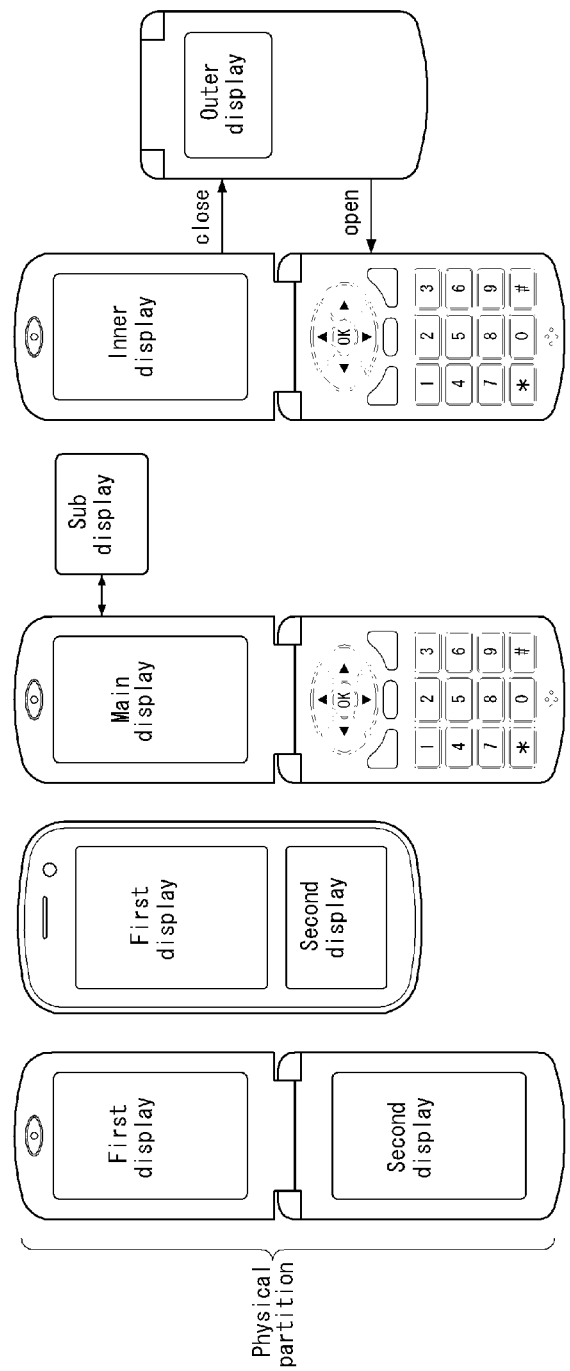
FIGS. 2C and 2D illustrate forms of the electronic device and display screens according to various embodiments.
Figure 2D:
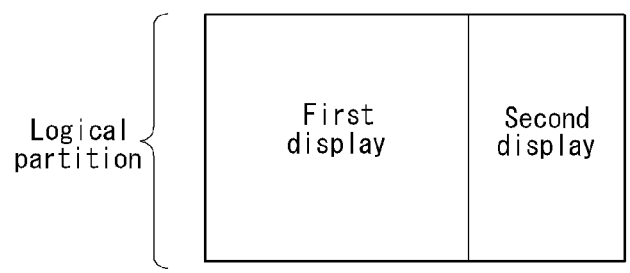

FIGS. 2C and 2D illustrate the electronic device 100 and the display module 151 according to various embodiments.

Referring to FIG. 2C, the display module 151 may include a first display and a second display that are physically separated from each other. In a folder type or slide type electronic device having two bodies connected through a hinge or a slide, the first display (or main display) may be formed on the inner face or outer face of one of the bodies, and the second display (or sub display) may be formed on the inner face or outer face of the other body. The sub display may be separated from the electronic device and may be detachably combined with the electronic device body through an interface to display data from the electronic device 100.

The display module 151 may include first and second displays that may be logically separated from each other in a display panel, as shown in FIG. 2D.

Figure 3:
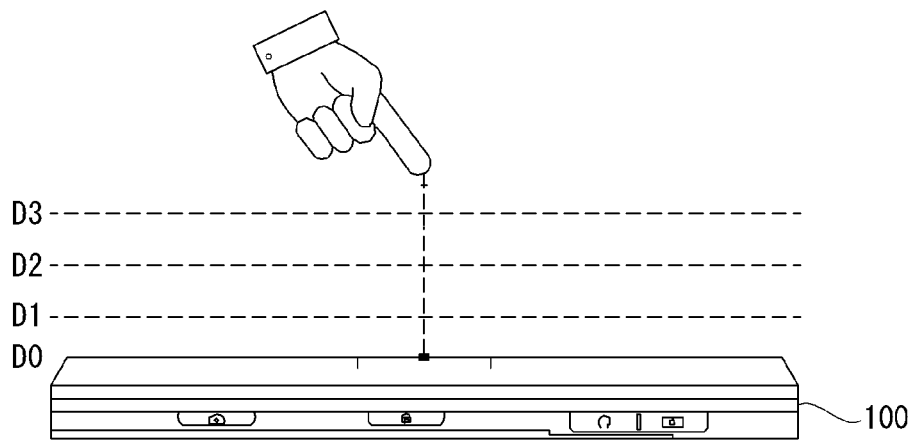
FIG. 3 is a view for explaining a proximity depth of a proximity sensor.

FIG. 3 is a view for explaining a proximity depth of a proximity sensor.

As shown in FIG. 3, when a pointer (such as a user's finger) approaches the touchscreen, the proximity sensor located inside or near the touchscreen may sense the approach of the pointer, and may output a proximity signal.

The proximity sensor may be constructed such that the proximity sensor outputs a proximity signal according to a distance between the pointer approaching the touchscreen and the touchscreen (referred to as "proximity depth").

The distance in which the proximity signal is output when the pointer approaches the touchscreen may be referred to as a detection distance. The proximity depth may be determined by using a plurality of proximity sensors having different detection distances and by comparing proximity signals respectively output from the proximity sensors.

FIG. 3 shows a section of the touchscreen in which proximity sensors capable of sensing three proximity depths may be provided. Proximity sensors capable of sensing less than three or more than four proximity depths may be provided in the touchscreen.

More specifically, when the pointer completely contacts the touchscreen (D0), it may be recognized as contact touch. When the pointer is located within a distance D1 from the touchscreen, it may be recognized as a proximity touch of a first proximity depth. When the pointer is located in a range between the distance D1 and a distance D2 from the touchscreen, it may be recognized as a proximity touch of a second proximity depth. When the pointer is located in a range between the distance D2 and a distance D3 from the touchscreen, it may be recognized as a proximity touch of a third proximity depth. When the pointer is located greater than the distance D3 from the touchscreen, it may be recognized as cancellation of the proximity touch.

Accordingly, the controller 180 may recognize the proximity touch as various input signals according to proximity distance and proximity position of the pointer with respect to the touchscreen, and the controller 810 may perform various operation controls according to the input signals.

Figure 4:
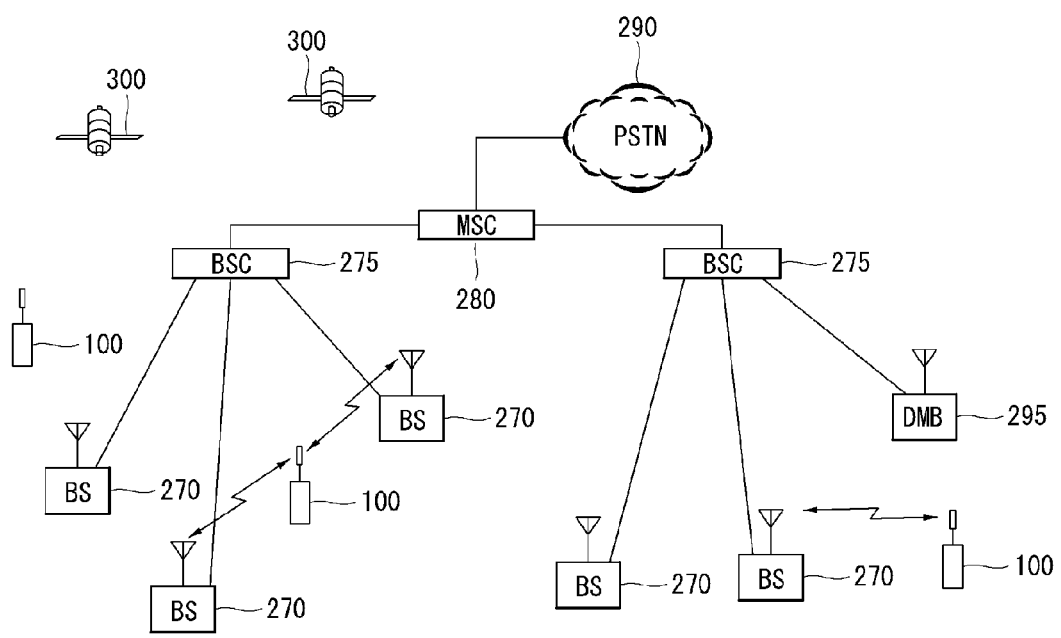
FIG. 4 illustrates a configuration of a CDMA wireless communication system communicating with the electronic device shown in FIG. 1.

Referring to FIG. 4, a CDMA wireless communication system includes electronic devices 100, base stations (BSs) 270, base station controllers (BSCs) 275, and a mobile switching center (MSC) 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial digital multimedia broadcasting (DMB) transmitter 295 can transmit broadcasting signals to the electronic devices 100 operating in the CDMA wireless communication system. The broadcast receiving module 111 of each electronic device 100 is constructed to receive the broadcasting signals transmitted from the DMB transmitter 295. This can be similarly applied to different types of broadcast and multicast signaling as described above.

FIG. 4 illustrates global positioning system (GPS) satellites 300. These satellites 300 can track the positions of some or all of the electronic devices 100. Although two satellites are shown in FIG. 4, position information can be obtained from less than two or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the electronic devices 100. The electronic devices 100 may be in a state that the electronic devices 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the electronic devices 100.

Figure 5:
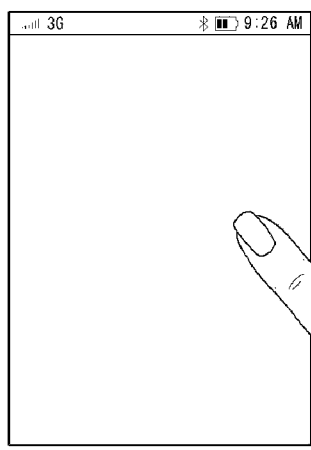
FIG. 5 is a view illustrating an embodiment of the present invention.
Figure 5:
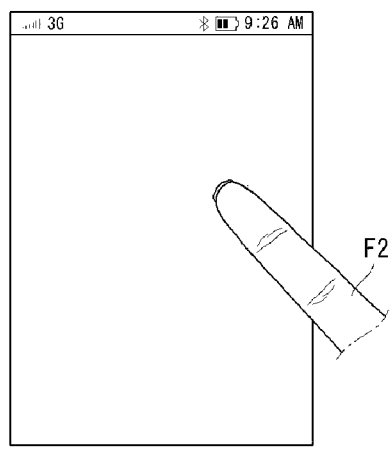
Figure 5:
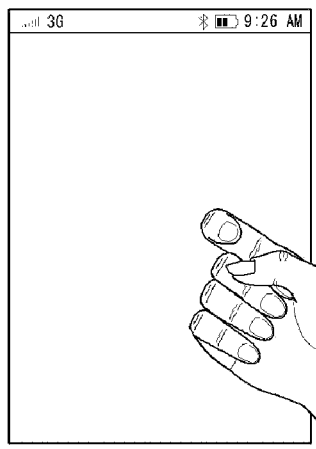

FIG. 5 is a view illustrating an embodiment of the present invention.

Referring to FIG. 5, the electronic device 100 according to an embodiment of the present invention may discriminate touch patterns of touch inputs received through the touchscreen 151 and execute functions respectively corresponding to the touch patterns.

The touch patterns of the touch inputs received through the touchscreen 151 may include at least one of a touch with a fingertip (FIG. 5(*a*)), a touch with a nail (FIG. 5(*b*)) and a touch with a knuckle of a bent finger (FIG. 5(*c*)). That is, the user may touch the touchscreen 151 with different portions of a finger to execute different functions respectively corresponding to points respectively touched by the different portions of the finger.

The controller 180 may sense a touch pattern of a touch input through the sensing unit 140 and execute a function corresponding to the sensed touch pattern. The function corresponding to the touch pattern may be previously stored in the memory. Otherwise, the function corresponding to the touch pattern may be set by the user.

Figure 6:
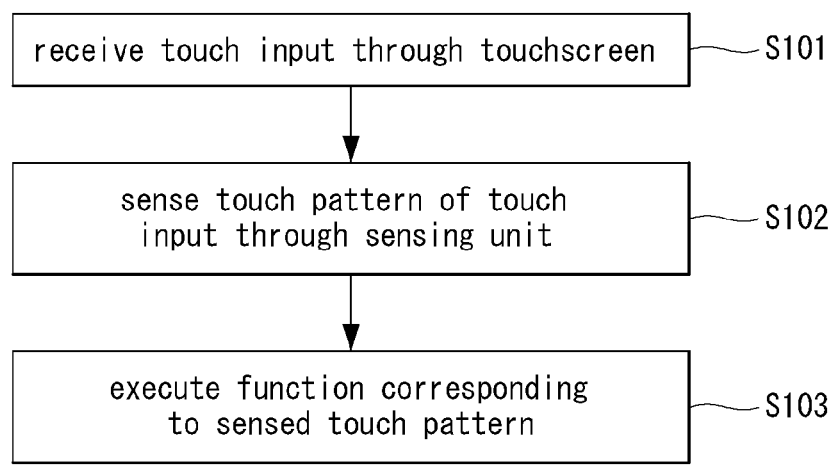
FIG. 6 is a flowchart illustrating a method of controlling an electronic device according to an embodiment of the present invention.

FIG. 6 is a flowchart illustrating a method of controlling the electronic device according to an embodiment of the present invention.

The controller 180 may receive a touch input through the touchscreen 151 (S101).

Touch inputs received through the touchscreen 151 may be applied with different portions of a finger of the user. For example, the user may touch the touchscreen 151 with a fingertip (FIG. 5(*a*)), a nail (FIG. 5(*b*)) or a knuckle (FIG. 5(*c*)).

Touch inputs received through the touchscreen 151 may be discriminated by the number of touches, touch durations, touch directions, etc. For example, a touch input applied by tapping the touchscreen 151 with a fingertip twice and a touch input of dragging with a nail can be recognized as different control signals.

The controller 180 may sense the touch pattern of the touch input through the sensing unit 140 (S102).

The sensing unit 140 can discriminate touch patterns based on a difference between vibrations generated when touch inputs corresponding to the touch patterns are received through the touchscreen 151. That is, the sensing unit 140 can discriminate the touch patterns by magnitudes, patterns and resonant frequencies of the vibrations.

Furthermore, the sensing unit 140 can discriminate the touch patterns based on contact areas between the touch patterns and the touchscreen 151, pressures of the touch patterns, intensities of the touch patterns, etc.

The sensing unit 140 may include at least one of an acceleration sensor, a gyro sensor and a touch sensor.

The acceleration sensor processes an output signal to measure a dynamic force of an object, such as acceleration, vibration, impact, etc. That is, the acceleration sensor can sense a moving state of the object with high accuracy.

Vibration characteristics may be varied according to a portion of a finger, which comes into contact with the touchscreen 151 at the instant the user touches the touchscreen 151 with the finger. The controller 180 can sense the vibration characteristics through the acceleration sensor. That is, the controller 180 can sense an acceleration value, intensity, etc. of a touch input. The controller 180 can discriminate a case in which the user touches the touchscreen 151 with a fingertip, a case in which the user touches the touchscreen 151 with a nail and a case in which the user touches the touchscreen 151 with a knuckle of a bent finger by different acceleration values and touch intensities in the respective cases.

Furthermore, the controller 180 can sense the vibration characteristics through the gyro sensor. That is, the controller 180 can sense a magnitude and resonant frequency of vibration generated when the user touches the touchscreen 151 through the gyro sensor.

The controller 170 can sense a posture of the electronic device 100 through the acceleration sensor and the gyro sensor and sense a touch input based on vertical and horizontal vector components with respect to the touchscreen 151 so as to filter interference of other factors, improving sensing accuracy.

In addition, the controller 180 can discriminate touch patterns of touch inputs applied through the touchscreen 151 by sensing pressures and areas of the touch inputs through the touch sensor.

That is, the controller 180 can discriminate touch inputs applied using different portions of a finger by using magnitudes and resonant frequencies of vibrations generated when the touch inputs are received, touch areas and touch pressures, etc. as information for discriminating the touch inputs through the acceleration sensor, gyro sensor and touch sensor.

The controller 180 can recognize a touch pattern by integrating information acquired through the acceleration sensor, gyro sensor and touch sensor, thereby determining the touch pattern with higher accuracy and executing a function corresponding to the touch pattern.

The controller 180 may execute a function corresponding to the sensed touch pattern (S103). The controller 180 may store different functions respectively corresponding to different touch patterns in the memory. The functions respectively corresponding to the touch patterns may be previously stored in the memory or set by the user.

For example, a menu window can be displayed when a touch input applied using a nail is received during execution of a predetermined application. When a touch input applied using a fingertip is received, the touch input can be recognized as an input for selecting at least one menu from the menu window.

Figure 7:
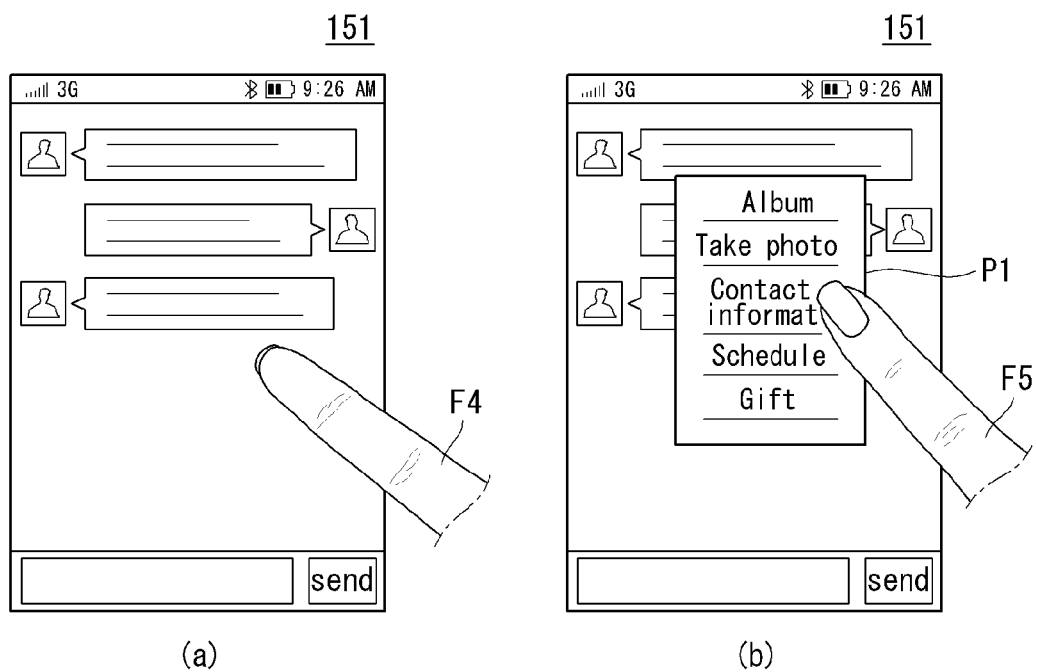
FIG. 7 illustrates a function of displaying a menu window according to an embodiment of the present invention.

FIG. 7 illustrates a function of displaying a menu window according to an embodiment of the present invention.

FIG. 7(*a*) illustrates a messenger application execution screen. As shown in FIG. 7(*a*), the user can touch the touchscreen 151 with a nail F4.

Upon reception of a touch input, the controller 180 may sense the received touch input through the sensing unit 140 and execute a function corresponding to the sensed touch input. For example, upon reception of the touch input F4 according to a fingernail of the user during execution of the messenger application, the controller 180 can display a menu window P1 on the messenger application execution screen. The menu window P1 may include items for accessing applications such as contact information, album, schedule, etc. which can be used in the messenger application.

FIG. 7(*b*) illustrates an operation of selecting an item of the menu window P1. For example, the user can select at least one item from the menu window P1 through a touch input F5 according to a fingertip.

That is, the controller 180 can execute the function of displaying the menu window P1 upon reception of the touch input F4 using a finger nail. Upon reception of the touch input F5 using a fingertip, the controller 180 can recognize the touch input F5 as an input for selecting at least one item of the menu window P1 and execute the selected item.

Figure 8:
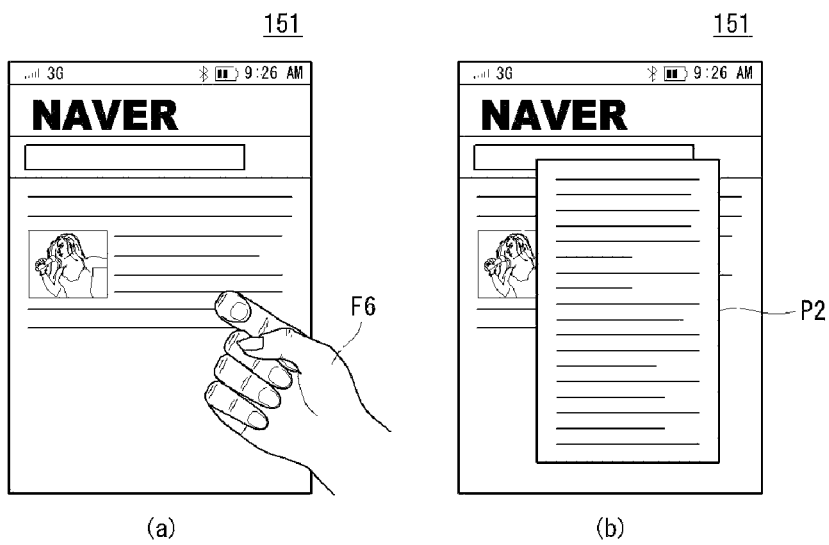
FIG. 8 illustrates execution of a predetermined application according to an embodiment of the present invention.

FIG. 8 illustrates an operation of executing a predetermined application according to an embodiment of the present invention.

FIG. 8(*a*) illustrates a webpage displayed on the touchscreen 151. As shown in FIG. 8(*a*), the user may apply a touch input F6 by bending a finger and tapping the touchscreen 151 with a knuckle of a bent finger twice while viewing the webpage.

As shown in FIG. 8(*b*), when the user bends a finger and taps the webpage displayed on the touchscreen 151 with a knuckle of a bent finger twice, the controller 180 can execute a memo application. That is, the controller 180 can display a memo application execution window P2 on the touchscreen 151.

When the touch input applied to the webpage displayed on the touchscreen and sensed through the sensing unit 140 is a touch input applied by tapping the webpage with a knuckle of a bent finger twice, the controller 180 can execute a predetermined application, for example, the memo application.

Figure 9:
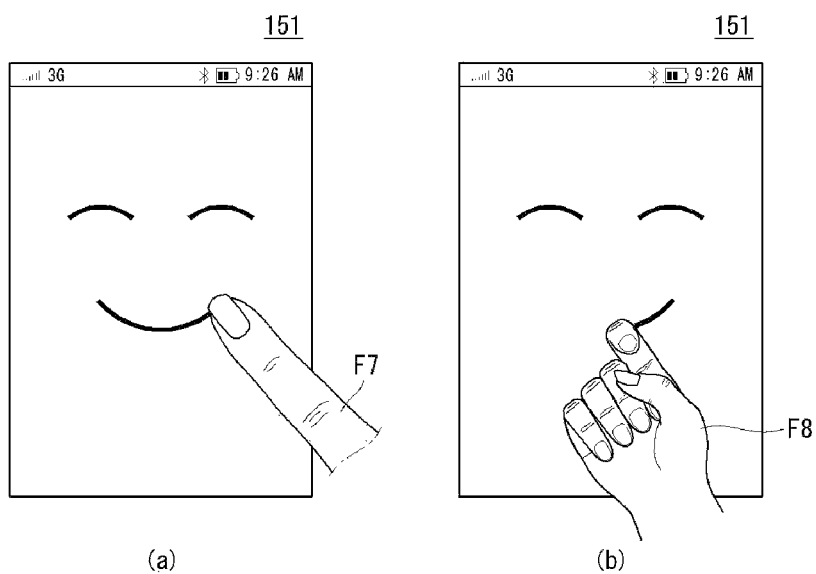
FIG. 9 illustrates an operation in a drawing mode according to an embodiment of the present invention.

FIG. 9 illustrates an operation in a drawing mode according to an embodiment of the present invention.

FIG. 9(a) illustrates a drawing mode execution screen. The drawing mode refers to a mode in which a memo can be input according to a touch input. As shown in FIG. 9(a), the user can touch the touchscreen 151 with a fingertip F7 to draw a picture.

Upon reception of the touch input F7 according to the fingertip, the controller 180 can display a touch trajectory corresponding to the touch input F7 on the touchscreen 151.

Referring to FIG. 9(b), upon reception of a touch input F8 applied by touching the touchscreen 151 with a knuckle of a bent finger, the controller 180 can execute a function of deleting a drawn picture along a touch trajectory corresponding to the touch input F8.

That is, the user can delete the memo displayed on the touchscreen 151 in FIG. 9(a) by bending a finger and touching the memo with a knuckle F8.

In this manner, the controller 180 can execute the function of displaying the trajectory corresponding to the touch input F7 applied using a fingertip in the drawing mode and the function of deleting the trajectory according to the touch input F8 applied using a knuckle of a bent finger.

Figure 10:
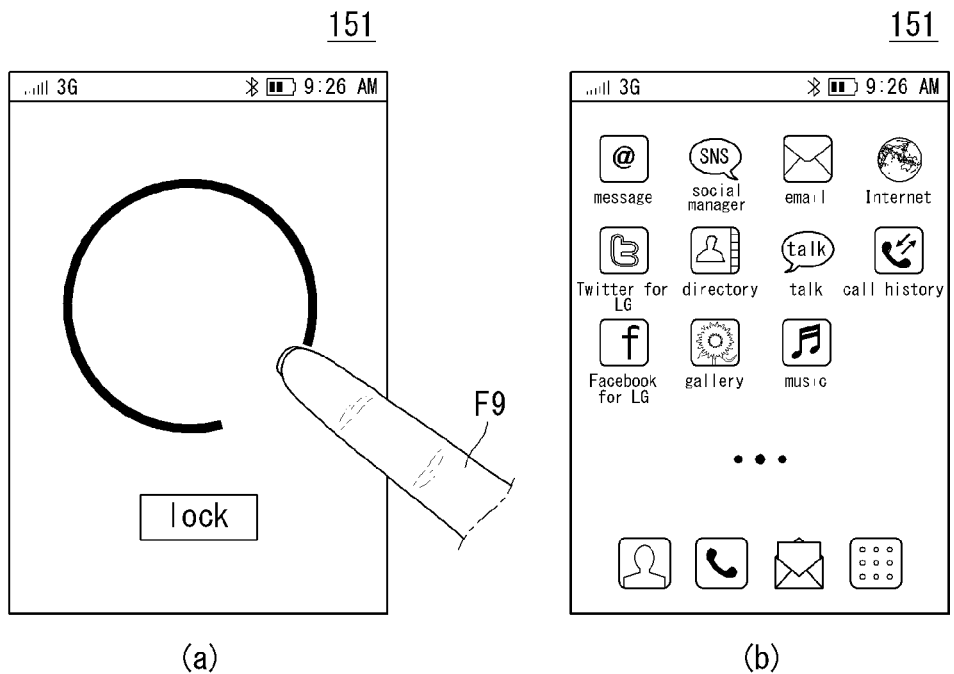
FIG. 10 illustrates an operation in a lock mode according to an embodiment of the present invention.

FIG. 10 illustrates an operation in a lock mode according to an embodiment of the present invention.

FIG. 10 shows an operation of cancelling the lock mode upon reception of a predetermined trajectory corresponding to a touch input when the touchscreen 151 is in the lock mode.

Referring to FIG. 10(a), the user may input a predetermined trajectory using a nail of the user. For example, the controller 180 can cancel the lock mode (FIG. 10(b)) upon reception of a touch input F9 for drawing a circle with a nail of the user in the lock mode.

That is, the controller 180 senses a touch pattern of a touch input applied in the lock mode and, when the sensed touch pattern corresponds to a touch pattern for drawing a predetermined trajectory with a nail of the user, executes a function of cancelling the lock mode.

Figure 11:
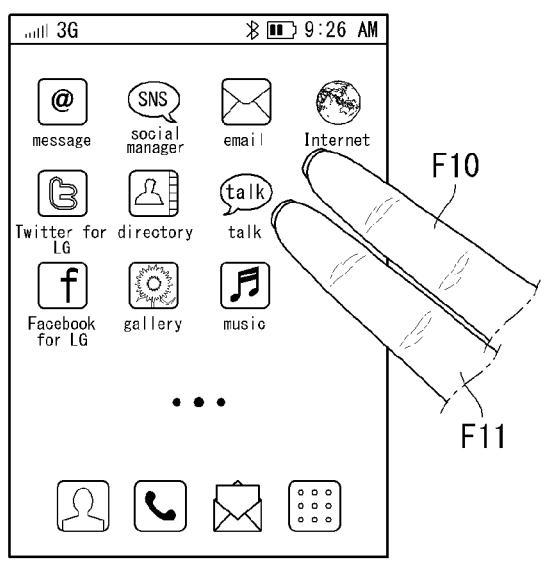
FIG. 11 illustrates an operation of displaying recently used applications according to an embodiment of the present invention.
Figure 11:
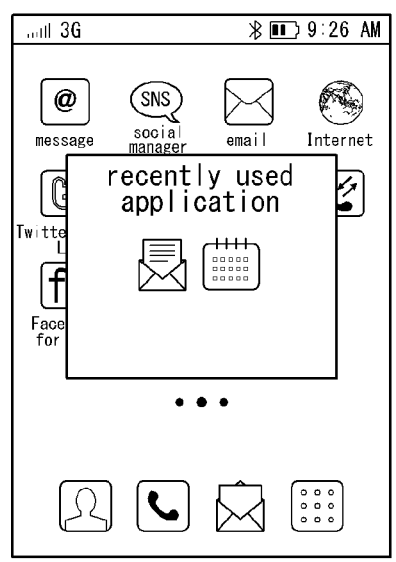

FIG. 11 illustrates an operation of displaying recently used applications according to an embodiment of the present invention.

Referring to FIG. 11(a), the user may apply a touch input by tapping the initial screen displayed on the touchscreen 151 with the nails of two fingers F10 and F11.

The controller 180 may sense the touch pattern of the touch input applied when the initial screen is displayed on the touchscreen 151 and execute a function of display a group of recently used applications when the sensed touch pattern corresponds to a touch pattern input according to the nails of two fingers (FIG. 11(b)).

Figure 12:
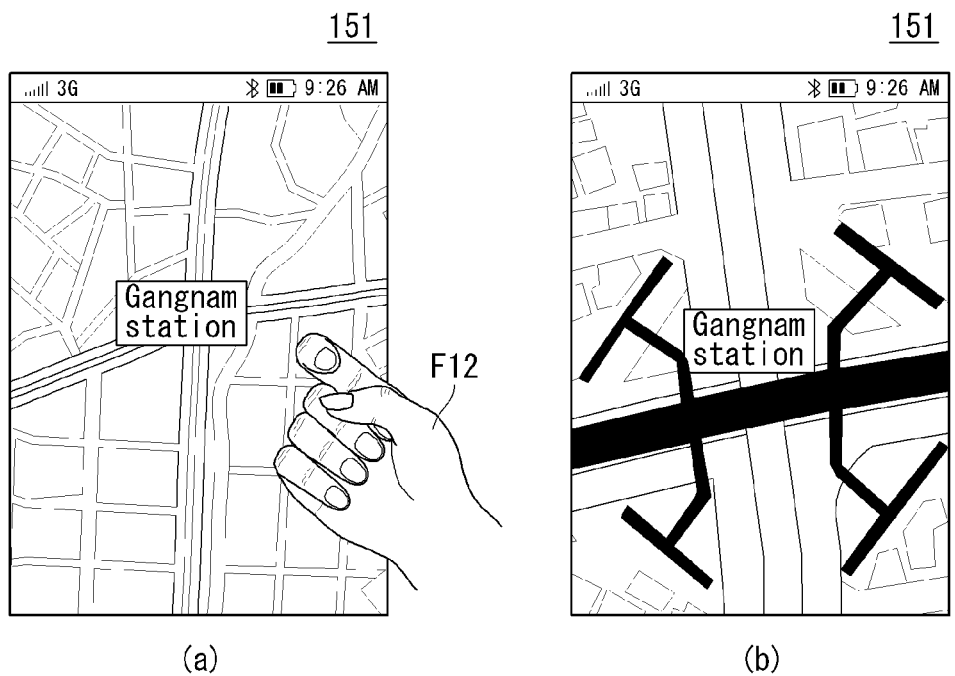
FIG. 12 illustrates a map application according to an embodiment of the present invention.

FIG. 12 illustrates an exemplary map application according to an embodiment of the present invention.

Referring to FIG. 12, the user may bend a finger and touch a map application displayed on the touchscreen 151 with a knuckle of the finger F12.

For example, when the user drags a region of a map displayed on the touchscreen 151 with a fingertip while the map application is executed, the controller 180 can move the map in a direction in which the drag input is received.

When the user bends a finger and touches the map with a knuckle of the finger while the map application is executed, the controller 180 can enlarge the map and display the enlarged map on the touchscreen 151.

That is, the controller 180 can sense a touch input applied through the touchscreen 151 while the map application is executed and, when the touch patter of the sensed touch input corresponds to a touch pattern input using a knuckle of a bent finger of the user, execute a function of enlarging the displayed map and displaying the enlarged map.

Figure 13:
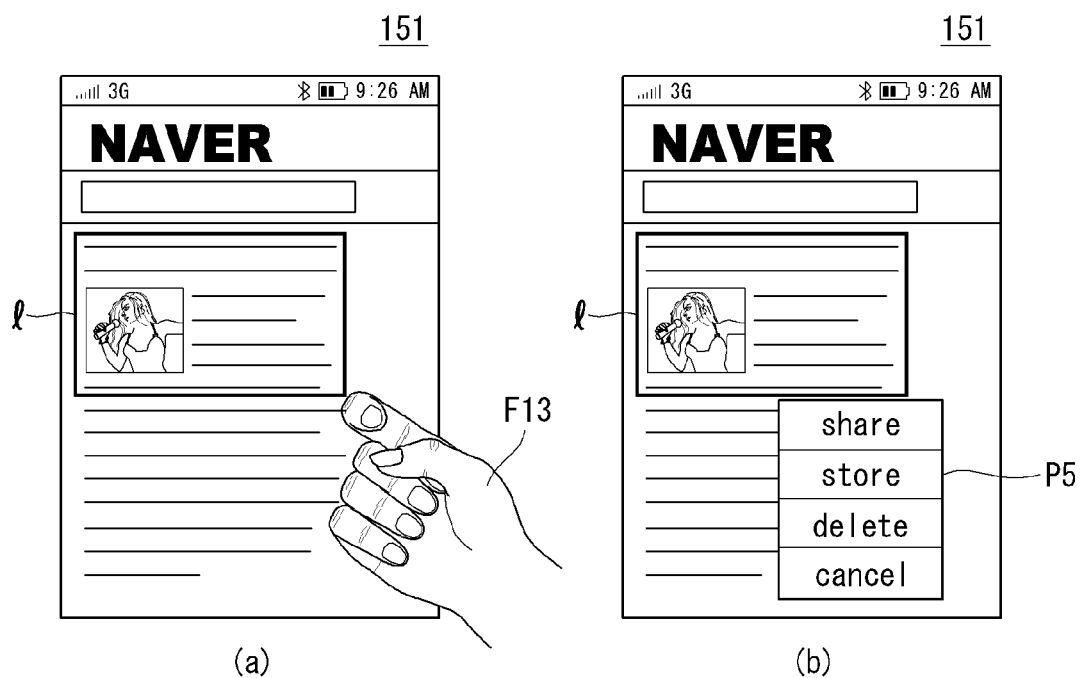
FIG. 13 illustrates an operation of editing part of a webpage according to an embodiment of the present invention.

FIG. 13 illustrates an operation of editing part of a webpage according to an embodiment of the present invention.

Referring to FIG. 13, the controller 180 may edit part of a webpage displayed on the touchscreen 151 when the user bends a finger and touches the webpage with a knuckle of the finger.

Referring to FIG. 13(a), the user may bend a finger and drag a region of the webpage displayed on the touchscreen 151 in the form of a closed curve 1 with a knuckle F13 of the finger. Then, the controller 180 may execute an edition function of cutting out the inner area of the closed curve upon reception of the drag input.

That is, the controller 180 can capture the closed curve area and manage the captured area as a file. Referring to FIG. 13(b), the controller 180 can execute edition functions of storing the captured area as a file, sharing and deleting the captured area.

Figure 14:
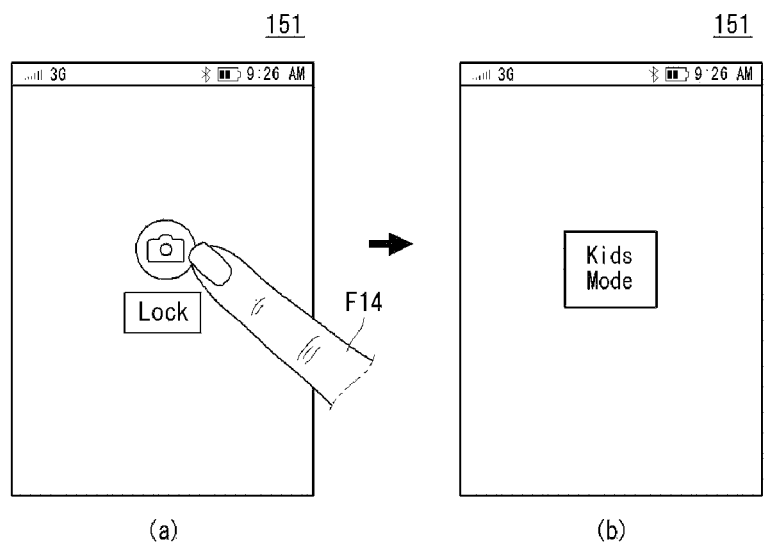
FIG. 14 illustrates an operation of cancelling the lock mode according to an embodiment of the present invention.
Figure 14:
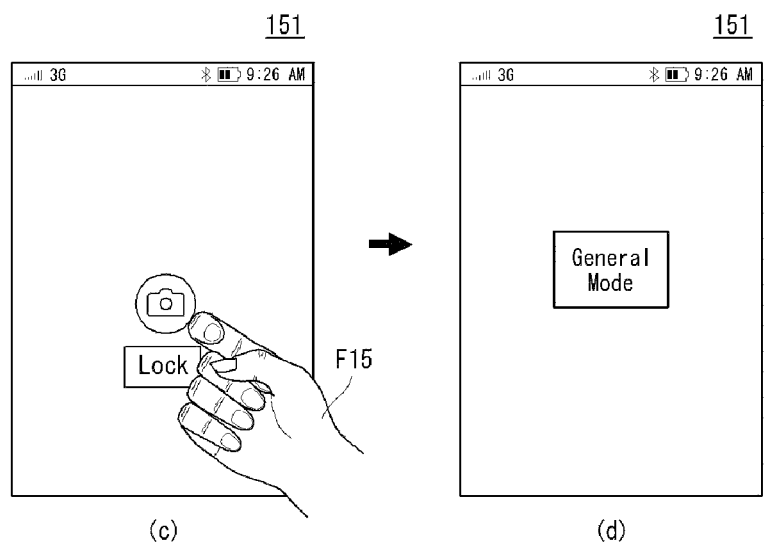

FIG. 14 illustrates an operation of cancelling the lock mode according to an embodiment of the present invention.

Referring to FIG. 14, when a touch input for cancelling the lock mode is applied to the touchscreen 151, a mode changed from the lock mode when the lock mode is cancelled may be determined based on a portion of a finger, used by the user to touch the touchscreen 151.

Referring to FIGS. 14(a) and 14(b), when the user touches the touchscreen 151 with a fingertip F14, the controller 180 can enter a kid's mode upon cancellation of the lock mode. The kid's mode refers to a mode in which only applications accessible by children can be executed. The kid's mode is a mere example of a protected mode as described herein.

Referring to FIGS. 14(c) and 14(d), when the user bends a finger and touches the touchscreen 151 with a knuckle F15 of the finger, the controller 180 can enter a general lock cancellation mode upon cancellation of the lock mode.

That is, the controller 180 can enter the kid's mode when the lock mode is cancelled upon recognition of a touch pattern input by the user with the fingertip F14 and enter the general lock cancellation mode upon recognition of a touch pattern input by the user with the knuckle F15 of the finger.

Figure 15:
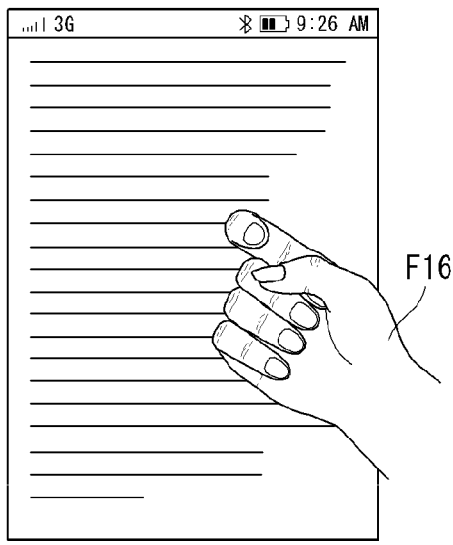
FIG. 15 illustrates an operation of inserting an image according to an embodiment of the present invention.
Figure 15:
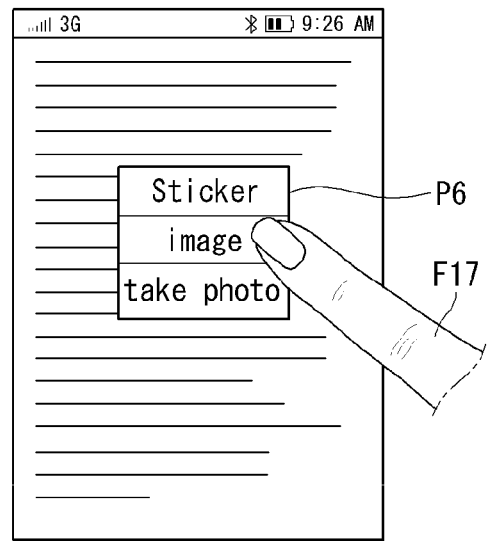
Figure 15:
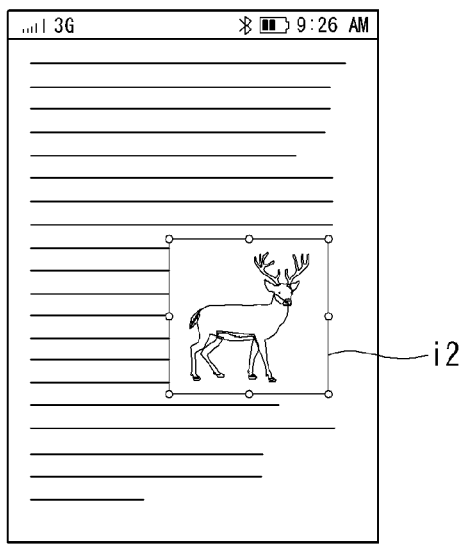

FIG. 15 illustrates an operation of inserting an image according to an embodiment of the present invention.

Referring to FIG. 15, the controller 180 can discriminate between a touch pattern input using a knuckle F16 of a finger and a touch pattern input using a fingertip F17.

Referring to FIG. 15(a), when the user bends a finger and touches the touchscreen 151 with the knuckle F16 of the finger, the controller 180 may display a pop-up window P6 related to image insertion on the touchscreen 151.

Referring to FIG. 15(b), upon reception of the touch input applied using the fingertip F17, the controller 180 may recognize the touch input as an input signal for selecting a menu of the pop-up window P6. For example, when the user touches 'image' with the fingertip F17, the controller 180 may enter a gallery application for image insertion to select an image to be inserted. FIG. 15(c) illustrates a predetermined inserted image i2.

That is, the controller 180 can display the menu window for image insertion upon recognition of a touch pattern using a knuckle of a finger and recognize a touch pattern input using a fingertip as an input for selecting a menu during execution of the memo application.

Figure 16:
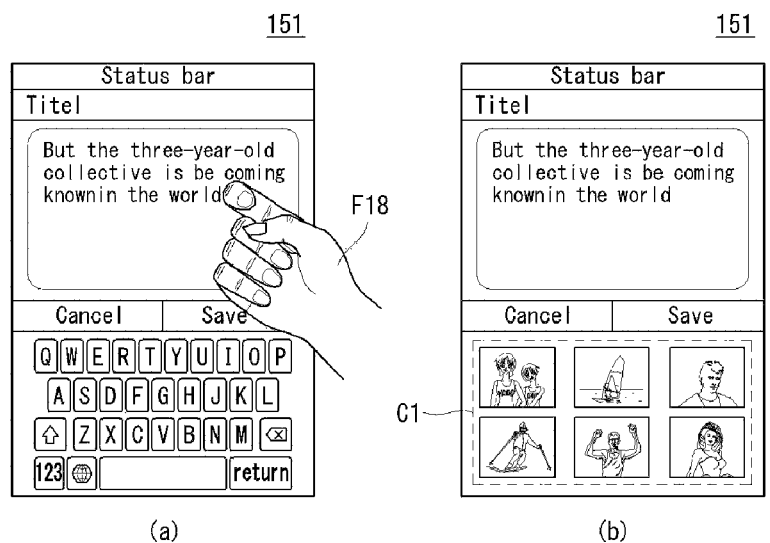
FIG. 16 illustrates an example of displaying clip art according to an embodiment of the present invention.

FIG. 16 illustrates an operation of displaying clip art according to an embodiment of the present invention.

Referring to FIG. 16, when the user bends a finger and touches the touchscreen 151 with a knuckle F18 of the finger while inputting a predetermined text through a message application, the controller 180 may display a predetermined image group (clip art) on the touchscreen 151.

The clip cart may be a group of images related to a lastly input text.

That is, when the user touches the touchscreen 151 with the knuckle F18 of the finger while inputting a predetermined text, the controller 180 can execute a predetermined function, for example, a function of displaying an image group related to the text.

Figure 17:
FIG. 17 illustrates an operation of writing a memo for data transmission during a call according to an embodiment of the present invention.
Figure 17:
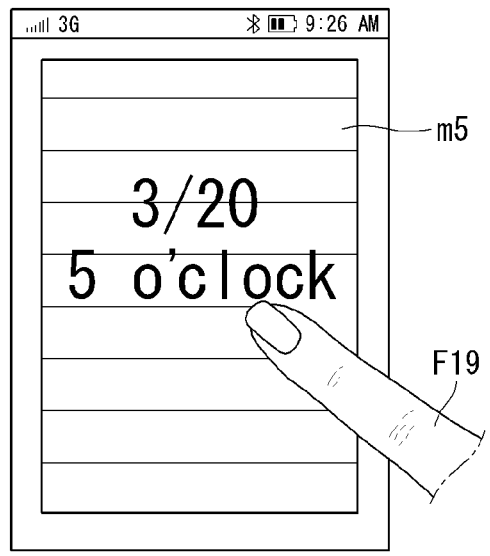
Figure 17:
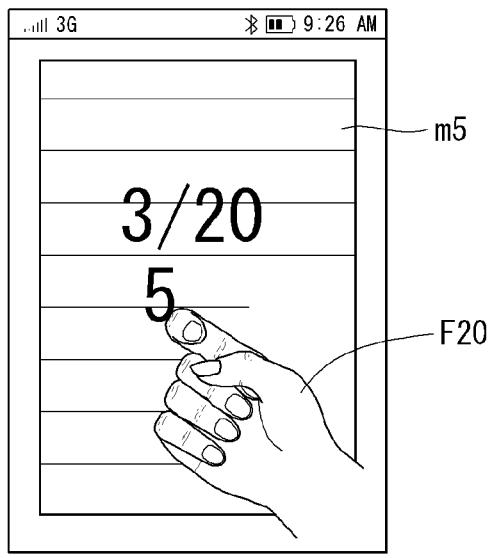

FIG. 17 illustrates an operation of writing a memo for data transmission during a call according to an embodiment of the present invention.

The electronic device 100 according to the present invention can transmit data to a recipient during a call. For example, the electronic device 100 can execute the memo application to generate a memo and transmit the memo to an electronic device of the recipient during a call.

Referring to FIGS. 17(a) and 17(b), the controller 180 may execute the memo application m5 to receive a predetermined memo during a call. That is, the controller 180 can recognize a touch pattern input using a fingertip F19 of the user as a predetermined memo input. Referring to FIG. 17(c), the controller 180 can recognize a touch pattern input using a knuckle F20 of a bent finger of the user as a signal for deleting the memo.

The sensing unit 140 of the electronic device 100 according to an embodiment of the present invention may include an acceleration sensor and a gyro sensor. Accordingly, upon reception of a touch input during operation of the microphone 122, the controller 180 can sense the touch pattern of the touch input through the sensing unit 140 and execute a function corresponding to the sensed touch pattern. For example, when the microphone 122 is used during a call or music play, the controller 180 can recognize and discriminate touch patterns.

Figure 18:
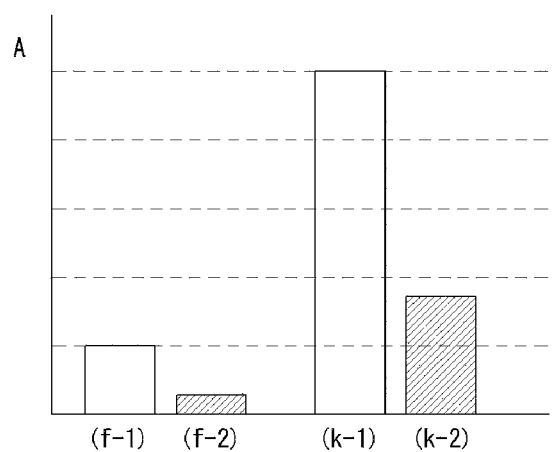
FIG. 18 is a graph showing accelerations of touch inputs according to an embodiment of the present invention.

FIG. 18 is a graph showing accelerations of touch inputs according to an embodiment of the present invention.

In FIG. 18, relative values of acceleration A of touch inputs are compared.

Specifically, the graph shows relative values of acceleration A of a touch input f-1 when the user touches the touchscreen with a fingertip gripping the electronic device 100 in a hand, a touch input f-2 when the user touches the touchscreen 151 with a fingertip with the electronic device 100 placed on a table, a touch input k-1 when the user touches the touchscreen 151 with a knuckle of a finger gripping the electronic device 100 in a hand, and a touch input k-2 when the user touches the touchscreen 151 with a knuckle of a finger with the electronic device 100 placed on a table.

It can be seen from FIG. 18 that a relatively large acceleration value is acquired when the user touches the touchscreen gripping the electronic device 100 in a hand (f-1 and k-1) compared to the case in which the user touches the touchscreen with the electronic device 100 placed on a table (f-2 and k-2). This means that an acceleration value can increase due to shaking of a hand or shaking of the electronic device 100 according to walking when the user holds the electronic device 100.

Furthermore, it can be seen from FIG. 18 that a relatively small acceleration value is acquired when the user touches the touchscreen with a fingertip (f-1 and f-2) compared to the case in which the user touches the touchscreen with a knuckle of a finger (k-1 and k-2).

The controller 180 can sense an acceleration value and intensity of a touch input, through the sensing unit 140 including an acceleration sensor.

The controller 180 may consider factors that may affect recognition of a touch pattern in addition to touch inputs according to a finger. For example, the factors may include shaking of a user's hand, shaking of the electronic device when the user walks, impact applied to the electronic device 100 when the electronic device is placed on a table, etc. An acceleration value and acceleration pattern sensed by the controller 180 through the sensing unit 140 may be varied due to the factors.

That is, the controller 180 can sense an acceleration value and acceleration pattern of a touch input and recognize the touch pattern of the touch input in consideration of a situation (e.g. impact applied to the electronic device due to a table on which the electronic device is placed, shaking of the electronic device, etc.) in which the touch input is applied.

The graph of FIG. 18 shows that various touch inputs may be applied with different acceleration values and the controller 180 may sense the different acceleration values through the sensing unit 140.

The above-described method of controlling the electronic device may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The contents of the computer readable recording medium may also be distributed over network coupled computer systems so that the computer readable code is stored and executed in a distribution fashion.

A electronic device may include a first touchscreen configured to display a first object, a second touchscreen configured to display a second object, and a controller configured to receive a first touch input applied to the first object and to link the first object to a function corresponding to the second object when receiving a second touch input applied to the second object while the first touch input is maintained.

A method may be provided of controlling a electronic device that includes displaying a first object on the first touchscreen, displaying a second object on the second touchscreen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising: a touchscreen; a sensing unit; a memory; and a controller operatively connected to the touchscreen, the sensing unit and the memory, the controller configured to sense, via the sensing unit, a touch input applied to the touchscreen, recognize a touch pattern based on the sensed touch input, and execute a function stored in the memory and corresponding to the recognized touch pattern, wherein the touch pattern is recognized based on a magnitude of a vibration of the electronic device generated when the touch input is applied to the touchscreen, a resonant frequency of the vibration, a location of the touch input on the touchscreen, contact area of the touch input on the touchscreen, and a pressure of the touch input applied on the touchscreen.

2. The electronic device of claim 1, wherein the sensing unit includes at least one of an acceleration sensor, a gyro sensor, or a touch sensor.

3. The electronic device of claim 1, wherein the touch pattern includes at least one of a touch pattern input using a fingertip, a touch pattern input using a fingernail, or a touch pattern input using a knuckle of a bent finger.

4. The electronic device of claim 1, wherein the function corresponding to the recognized touch pattern includes at least one of a function of executing a predetermined application, a function of displaying a menu window, or a function of selecting a menu.

5. The electronic device of claim 1, further comprising: a microphone, wherein the controller is configured to sense the touch pattern when the touch input is received during an operation of the microphone.

6. The electronic device of claim 1, wherein the controller is configured to recognize the touch pattern is one of a touch pattern input using a fingertip, a touch pattern input using a fingernail, or a touch pattern input using a knuckle of a bent finger based on a corresponding vibration generated when the touch input is a touch input using the fingertip, a vibration generated when the touch input is a touch input using the fingernail, or a vibration generated when the touch input is a touch input using the knuckle of the bent finger.

7. A method of controlling an electronic device that includes a touchscreen, a sensing unit, a processor and a memory, the method comprising: sensing, by the electronic device, a touch input applied to the touchscreen, recognizing, by the electronic device, a touch pattern based on the sensed touch input, and executing, by the electronic device, a function stored in the memory and corresponding to the recognized touch pattern, wherein the touch pattern is recognized based on a magnitude of a vibration of the electronic device generated when the touch input is applied to the touchscreen, a resonant frequency of the vibration, a location of the touch input on the touchscreen, contact area of the touch input on the touchscreen, and a pressure of the touch input on the touchscreen.

8. The method of claim 7, further comprising: recognizing the touch pattern is one of a touch pattern input using a fingertip, a touch pattern input using a fingernail, or a touch pattern input using a knuckle of a bent finger based on a corresponding vibration generated when the touch input is a touch input using the fingertip, a vibration generated when the touch input is a touch input using the fingernail or a vibration generated when the touch input is a touch input using the knuckle of the bent finger.

* * * * *